Figure 1:
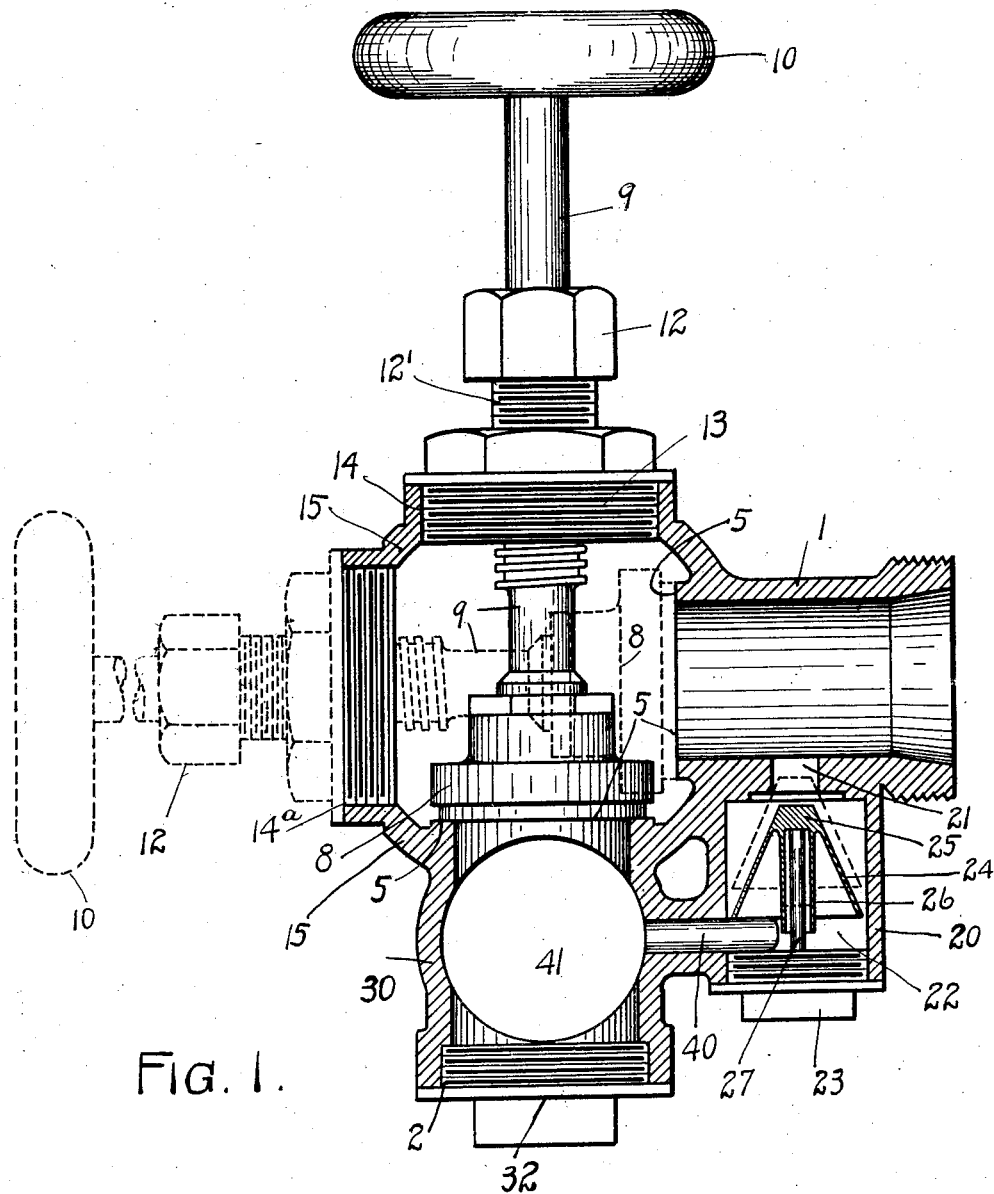

July 12, 1927.

J. F. PARKER

VALVE

Filed March 14, 1921

1,635,287

2 Sheets-Sheet 1

INVENTOR.
Joseph F. Parker
By John J. Strehli
ATTORNEY.

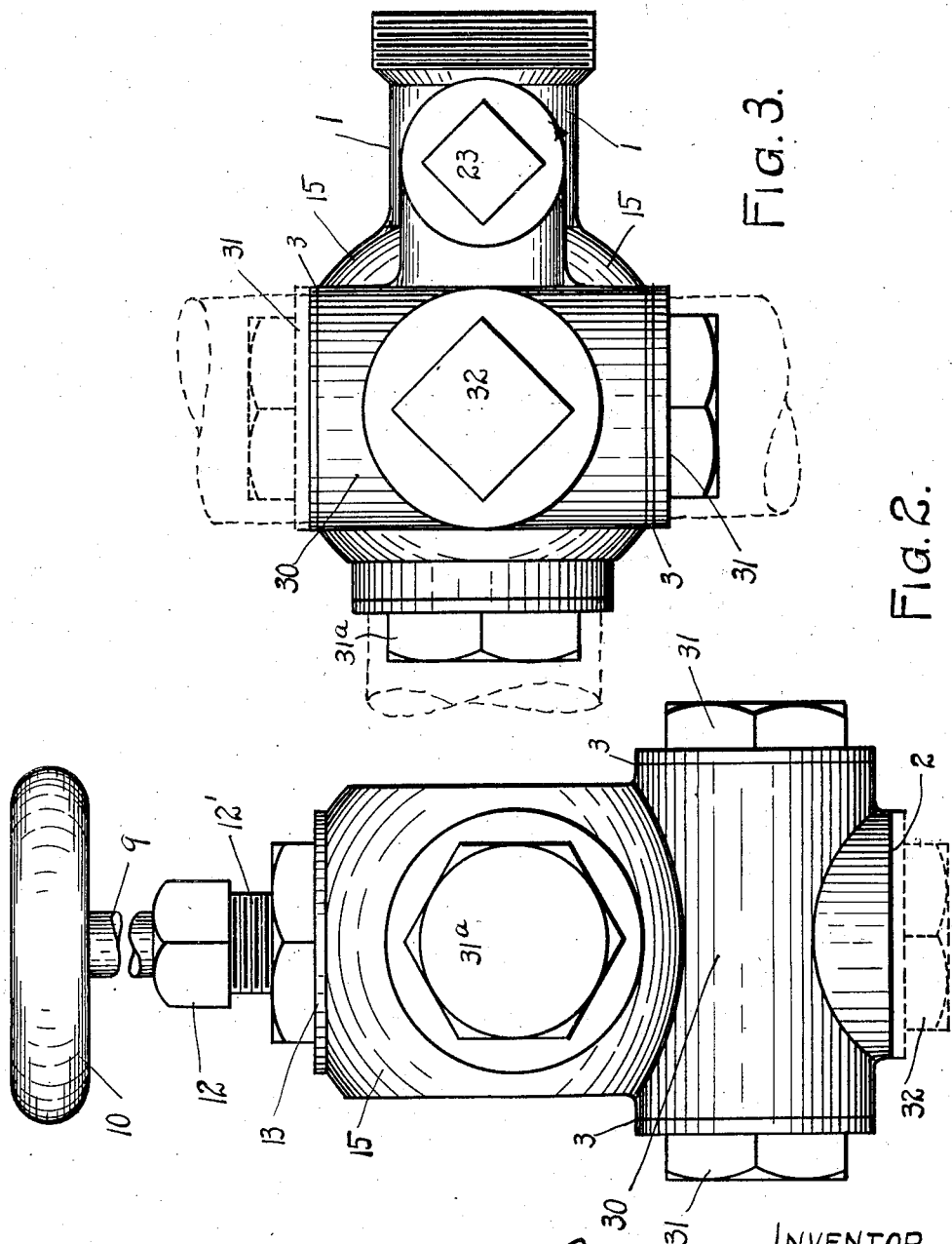

Patented July 12, 1927.

1,635,287

UNITED STATES PATENT OFFICE.

JOSEPH F. PARKER, OF CINCINNATI, OHIO; JOHN ROBERT BURGAMY ADMINISTRATOR OF SAID JOSEPH F. PARKER, DECEASED.

VALVE.

Application filed March 14, 1921. Serial No. 452,384.

My invention belongs more particularly to that class of valves known as "radiator valves," used in connection with steam and hot water heating systems.

It consists in a unique combination of elements, forming a cheap, simple and highly efficient valve for automatic release and drainage of water condensed in radiator pipes and the like; it can be used in a vertical or horizontal position and be seated to open and close in either position, and it acts as a three way valve, for right or left hand connection to steam pipes and also for upright connection; thus making it practically universal in use, and enabling its easy and ready connection to steam pipes which are in varied positions or which are hard to reach; I therefore combine in one valve all the elements needed, for which valves of different constructions and of manifold numbers are now needed to suit varying conditions, which are reached by my single valve.

Its various features and advantages will readily become apparent from the following specification.

In the accompanying drawings forming part of this specification:

Fig. 1 is a central longitudinal section of the valve, certain parts being left in elevation, Fig. 2 is a view in elevation of one end of the valve, and Fig. 3 is a bottom view of the valve.

In the present instance, the pipe connection 1 leads to the radiator, to hold the valve in connection therewith and the steam pipes can be connected at the point 2 or at either of the points 3, as shown by dotted lines in Fig. 3; these steam pipes are also used to discharge the condensation and allow it to run off, as will be hereinafter described.

At the inner end of pipe connection 1, 1 provide a valve seat 5, a valve seat 5 also being present at the inner end of the extension coupling member 30 and a valve head 8 works up and down off of valve seat 5. The valve head 8 is at the end of valve stem 9 which carries at its upper end a hand wheel 10 and is provided with a stuffing box 12; a screw threaded part 13 being provided by means of which the stem, valve head and its connecting parts are screwed into screw threads 14 or 14ª, which are formed on the body part or casing of the valve, which is a casting or housing 15. Operating the hand wheel in the proper direction either forces valve 8 on or lifts it off of the valve seat 5. The dotted lines in Fig. 1, show that this same construction can be used in a horizontal position as well as in a vertical one, as shown in full lines in said Fig. 1; thus the valve can be used in a double capacity for valve use on radiators. When the valve is not used in the horizontal position, the port having the screw threads 14ª is closed by a cap 31ª, see Figs. 2 and 3.

The pipe 1, has extending down therefrom a short pipe 20, and a passage way 21 is present between pipe 1 and pipe 20 and leads from one into the other. A chamber 22 is formed by the pipe 20, which is closed at the bottom by a screw threaded plug 23. In the chamber 22, I place a check valve, composed of a central hollow valve part 24 having a point 25, and a depending valve stem sleeve 26 which fits over and is guided on valve stem or rod 27 for guiding the sleeve 26. The point 25 of the check valve works up and down in the hole 21 and consequently opens and closes the same as needed in the operation of the valve.

At the lower end of the casting, body, or housing 15, I form the integral short pipe or cross-shaped hollow member 30, open at each end of its horizontal portion and having screw caps 31 screwed into said ends. At the bottom of the short pipe 30, I provide the inlet or opening 2 closed by a screw cap 32. Any one of these screw caps 31 or cap 32, can be removed and the valve casing be connected at any of these points to a steam pipe, thus making it possible to connect the valve in any position, and under any circumstances, making a three way valve.

When connected at any of these points, the other openings are closed by the caps provided for them.

A short steam inlet pipe or by-pass 40, leads from the interior 41 of short pipe 30 to the chamber 22 in short pipe 20 (see Fig. 1), and this pipe 40 allows steam to pass into said chamber 22; the condensation also passes out of this pipe as will be hereinafter set forth.

The stuffing box 12, screws up and down on the threads 121. The guide or valve stem 27 is usually made rigid with the screw cap 23 and moves in and out therewith; and through this screw cap the inside of the valve chamber 22 can be reached and cleaned.

Turning the hand wheel 10 in the proper direction, either seats or unseats the valve head 8 on the valve seat 5; and in unseating the valve head, steam is allowed to enter into the short pipe 1, from which it travels into the radiator. It may be stated here, that when the valve is not in use, any condensation in the radiator or connecting pipes, passes out through the by-pass 21 into the chamber 22 and from there passes out through the by-pass 40 into the interior 41 of the short pipe 30, from which point it passes off through the steam pipe, which is connected at either the point 2 or points 3; and it will always pass off, thus leaving the radiator free from condensation; and as just described, the check valve 24 will be in the position shown in full lines in Fig. 1. When the steam pressure becomes great enough, it passes in under the said check valve and raises it as shown in dotted lines in said Fig. 1; its upper end or nose 25, extending up into the pass 21, cutting off the entry of any steam through said pass and allowing, if valve head 8 is unseated the free passage of the steam through the pipe 1. When the steam pressure falls low enough, then the check valve again falls, allowing for automatic relief of condensation.

The provision allowing of the valve to be connected to the right or left or in a vertical manner to steam pipes, is the salient feature of this invention; and this feature in combination with the double seating arrangement, and the automatic operation of the check valve as described, allows me to produce a highly useful valve and one which posseses general adaptation and marked utility.

While I have described one specific construction for carrying my invention into effect, it will be readily apparent that the same is capable of some change and modification, without departing from the spirit and principle of my invention.

What I claim as new and my invention and desire to secure by Letters Patent is:

1. A valve connection of the character described including a hollow body part provided with an upwardly extending threaded collar and a laterally extending threaded collar, a steam outlet sleeve connected to the body, arranged opposite to the laterally extending collar and provided with a valve seat, a cross-shaped hollow member having its upwardly extending leg connected to the hollow body and terminating within said body in a valve seat, a threaded member engaging one of said collars, a valve head and an operating member for the same carried by the threaded member and adapted to engage one of said valve seats, the laterally extending arms and the depending leg of the cross-shaped member being provided with openings to permit steam to be fed into the cross-shaped member, and caps closing certain of said openings.

2. A valve connection of the character described including a hollow body part provided with an upwardly extending threaded collar and a laterally extending threaded collar, a steam outlet sleeve connected to the body, arranged opposite to the laterally extending collar and provided with a valve seat, a cross-shaped hollow member having its upwardly extending leg connected to the hollow body and terminating within said body in a valve seat, a threaded member engaging one of said collars, a valve head and an operating member for the same carried by the threaded member and adapted to engage one of said valve seats, the laterally extending arms and the depending leg of the cross-shaped member being provided with openings to permit steam to be fed into the cross-shaped members, caps closing certain of said openings, an auxiliary pipe communicating with the steam outlet sleeve and the cross-shaped member, and a check valve arranged in the auxiliary pipe for closing said communication.

In testimony whereof, I affix my signature at Cincinnati, Ohio, this 11th day of March, 1921.

JOSEPH F. PARKER.